(12) United States Patent
Yoshikawa et al.

(10) Patent No.: US 6,554,886 B2
(45) Date of Patent: Apr. 29, 2003

(54) POROUS ADSORBENT AND FILTER

(75) Inventors: Takayuki Yoshikawa, Okayama-ken (JP); Masaki Fukuura, Okayama-ken (JP); Shushi Nishimura, Okayama-ken (JP)

(73) Assignee: Kuraray Chemical Co., Ltd., Bizen (JP)

( * ) Notice: Subject to any disclaimer, the term of this patent is extended or adjusted under 35 U.S.C. 154(b) by 0 days.

(21) Appl. No.: 09/933,657

(22) Filed: Aug. 22, 2001

(65) Prior Publication Data

US 2003/0041735 A1 Mar. 6, 2003

(51) Int. Cl.$^7$ .......................... B01J 20/22; B01D 53/72
(52) U.S. Cl. ........................................ 96/154; 502/159
(58) Field of Search ............... 95/141, 128; 96/108, 96/153, 154; 423/245.1, 245.2; 502/159, 167

(56) References Cited

U.S. PATENT DOCUMENTS

| 4,374,814 A | * | 2/1983 | Gaylord | 422/36 |
| 4,737,173 A | * | 4/1988 | Kudirka et al. | 55/470 |
| 5,231,063 A | * | 7/1993 | Fukumoto et al. | 252/190 |
| 5,603,927 A | * | 2/1997 | Fukumoto et al. | 424/400 |

FOREIGN PATENT DOCUMENTS

| JP | 53-9709 A | * | 1/1978 |
| JP | 55-159836 | | 12/1980 |
| JP | 56-053744 | | 5/1981 |
| JP | 60-048138 | | 3/1985 |
| JP | 61-285973 A | * | 12/1986 |
| JP | 04-358536 | | 12/1992 |
| JP | 11-114041 A | * | 4/1999 |
| JP | 11-285619 | | 10/1999 |
| JP | 2000-301667 A | * | 10/2000 |
| JP | 2001-524 A | * | 1/2001 |
| JP | 2001-232189 A | * | 8/2001 |

* cited by examiner

Primary Examiner—David A. Simmons
Assistant Examiner—Frank M. Lawrence
(74) Attorney, Agent, or Firm—Oblon, Spivak, McClelland, Maier & Neustadt, P.C.

(57) ABSTRACT

A porous adsorbent with a urea compound having a urea linkage within the molecule thereof and an inorganic acid and/or an organic acid supported on a porous support is shown. The porous adsorbent is capable of efficiently eliminating lower aldehydes at ordinary temperature for a prolonged period of time.

42 Claims, No Drawings

POROUS ADSORBENT AND FILTER

BACKGROUND OF THE INVENTION

1. Field of the Invention

The present invention relates to an air filter or air cleaner. More particularly, it relates to a porous adsorbent highly capable of removing aldehydes, in particular lower aldehydes such as formaldehyde and acetaldehyde, contained in a gaseous phase therefrom.

2. Prior Art

Various adsorbents have so far been developed for the purpose of removing odor components occurring in the living environment and working environment. In recent years, the problems of odor and odor hazards have attracted attention from the viewpoint of further improvement in the living environment and working environment and the adsorbent of an agent capable of more effectively eliminating lower aldehydes, such as formaldehyde and acetaldehyde, in particular, among those odor components has been earnestly waited for.

In the art, such porous adsorbents as activated carbon, activated clay, silica gel and activated alumina, in particular porous adsorbents with activated carbon as a support, have been used in most cases for removing lower aldehydes. These adsorbent, however, have drawbacks; they are low in adsorbent capacity for lower aldehydes and the duration of their adsorbing power, namely their life, is short.

As means of making improvements in these respects, there have also been proposed various adsorbents whose adsorbent capacity for lower aldehydes is increased by carrying various organic or inorganic compounds on porous carriers or supports. Thus, in Japanese Patent Publication 54095/1985, Japanese Laid-Open Patent 159836/1980, Japanese Laid-Open Patent 48138/1985, Japanese Laid-Open Patent 358536/1992 and Japanese Laid-Open Patent 285619/1999, there are proposed adsorbents which comprise organic compounds reactive with lower aldehydes, for example aniline, hydrazines, aliphatic primary or secondary amines, saturated cyclic secondary amines or ureas, fixed or immobilized on a porous adsorbent such as activated carbon. Also proposed are adsorbents comprising inorganic compounds, such as acidic ammonium salts, sulfite salts, metal oxides, metal sulfates, metal acetates or metal carboxylates, carried on a porous support such as activated carbon and, further, adsorbents derived from the above-mentioned adsorbents by causing a platinum compound to be supported thereon as a catalyst.

However, those adsorbents which carry organic compounds are unstable in adsorbent capacity, namely their adsorbent capacity changes with the lapse of time, and they further have the problem that their odor, among others, is harmful to humans. Another disadvantage of these adsorbents carrying organic compounds is that they are poor in heat resistance. In addition, they cannot be said to be satisfactory from the rate of adsorption viewpoint.

On the other hand, adsorbents carrying an inorganic compound are also known. However, these are generally insufficient in rate of adsorption., Those carrying a catalyst such as a platinum compound are disadvantageous in that they are poor in adsorbent capacity at ordinary temperature. As discussed hereinabove, the adsorbents so far proposed can hardly be said to be satisfactory in eliminating lower aldehydes. Accordingly, it is an object of the present invention to provide an adsorbent which can remove lower aldehydes at ordinary temperature with high efficiency for a prolonged period of time and which is excellent in removal rate, heat resistance and safety.

SUMMARY OF THE INVENTION

The present inventors made intensive investigations in an attempt to accomplish the above object and have now completed the present invention. Thus, the invention provides a porous adsorbent which comprises a urea compound having a urea linkage within the molecule thereof and an inorganic acid and/or an organic acid, each carried on a porous carrier or support. In another aspect, the present invention provides a filter formed from the above porous adsorbent.

DETAILED DESCRIPTION OF PREFERRED EMBODIMENTS OF THE INVENTION

The urea compound having a urea linkage within the molecule thereof is a compound derived from urea by substituting an alkyl or acyl group for at least one hydrogen atom thereof and may have either a linear structure or a cyclic structure. The linear urea has a urea linkage which does not directly form a cyclic structure. It includes, among others, methylurea, ethylurea, dimethylurea, diethylurea, tetramethylurea, acetylurea, acetylmethylurea, phenylurea and diphenylurea.

Among the urea compounds, the cyclic urea includes 2-imidazolidone (ethyleneurea), hydantoin, allantoin, alloxanic acid, parabanic acid (oxazolylurea), 5,5-methylhydantoin (acetylurea), urazole, barbituric acid (malonylurea), alloxan (mesoxalylurea), dialuric acid (hydroxymalonylurea), uramil (aminobarbituric acid), dilituric acid (nitrobarbituric acid), violuric acid (isonitrosobarbituric acid), pseudouric acid (ureidobarbituric acid), uracil (2,4-dihydroxypyrimidine), thymine (5-methyluracil), isocyanuric acid, uric acid (2,6,8-trihydroxypurine), alloxanthine and the like.

Among the urea compounds, cyclic urea compounds are preferred since the effects of the invention are produced more efficiently with them. Among the cyclic urea compounds, 2-imidazolidinone (ethyleneurea) and pseudouric acid are preferred. The urea compounds may be used singly or two or more of them may be used in combination. The amount of a urea compound to be carried on a porous support is 0.5 to 60% by weight, preferably 5 to 30% by weight, relative to the weight of the porous support in an anhydrous state.

By causing the urea compound to be carried on a support together with an inorganic or organic acid in accordance with the present invention, it becomes possible to markedly improve the rate of elimination by the resulting adsorbent. The inorganic acid to be used according to the invention includes, among others, hydrochloric acid, sulfuric acid, nitric acid and phosphoric acid, and the organic acid includes, among others, carboxylic acids, sulfonic acids, sulfinic acids, phenols, enols, thiophenols, imides, oximes, aromatic sulfonamides, and primary and secondary nitro compounds.

Hydrochloric acid, sulfuric acid, nitric acid and phosphoric acid, among others, are preferred as the inorganic acid, and carboxylic acids, sulfonic acids and sulfinic acids, among others, as the organic acid. The inorganic or organic acids may be used singly or two or more of them may be used in combination. The amount of the inorganic or organic acid(s) to be supported on the porous support is 0.1 to 30% by weight, preferably 1 to 15% by weight, based on the weight of the porous support in an anhydrous state.

The porous support to be used in the practice of the present invention is not particularly restricted but may be any of those substances which can support the urea compound and inorganic or organic acid, including, among others, activated carbon, activated clay, activated alumina, zeolite, silica gel and the like. Among them, activated carbon is preferably used. The porous support may be a powdery, granular, fibrous, cloth-like, or may be formed into a spherical, cylindrical, honeycomb-like, plate-like, paper-like or sheet-like form, for instance.

For causing the urea compound and the inorganic acid and/or organic acid to be borne on the porous support, the following methods, for instance, may be mentioned. In cases where a water-soluble urea compound and an inorganic or organic acid are used, the following method (1) or (2) may be employed. (1) The said compound and the inorganic or organic acid are dissolved in advance in water and then caused to be supported on the porous support by immersing the latter in that aqueous solution, followed by drying. (2) The said compound and the inorganic or organic acid are dissolved in advance in water and then caused to be carried on the porous support by spraying or sprinkling this aqueous solution on the support, followed by drying. The order of causing the urea compound and the inorganic or organic acid to be borne on the support is not particularly restricted.

The following methods (3) to (5) can also be employed, irrespective of solubility or insolubility in water. (3) An emulsion is prepared by adding a dispersant, a binder and/or the like to the said compound and the inorganic or organic acid, and the porous support is sprayed with the emulsion for supporting. (4) The said compound and the inorganic or organic acid are added, together with a solvent, a binder and/or the like, to the porous support which is in a powdery, granular or fibrous form, and the resulting mixture is granulated or molded into a honeycomb-like, plate-like, paper-like or like form. (5) An emulsion is prepared by adding the porous support, which is in a powdery, granular or fibrous form, to (3) and a urethane foam, nonwoven fabric, paper or honeycomb-like or other molding is impregnated or coated with the emulsion. The product is used as an air cleaning agent or an adsorbent for lower aldehydes, for instance.

As the binder which is used according to need in the supporting method (3) or (4) mentioned above, there may be mentioned, for example, carboxymethylcellulose, acrylic emulsions, ethylene fluoride dispersions, nitrocellulose, polyvinyl alcohol, water glass and pulp. As for the amount of the binder, the smaller, the more preferred.

The porous adsorbent obtained by causing the urea compound etc. on the porous support is preferably used as air cleaner and, further, it is practical and preferable to shape it into a filter for use as a filter for air cleaning. In shaping the porous adsorbent, a finely divided binder is admixed with the porous adsorbent to thereby coat the porous adsorbent surface with the binder, and then the coated porous adsorbent is subjected to pressure molding. Preferred as the binder is one enabling fusion under heating without using water or an organic solvent. From such viewpoint, thermoplastic resins are preferred as the binder, and polyolefin resins such as polyethylene and polypropylene are more preferred in view of their softening and fusion temperatures. In cases where fastness to rubbing is required, the use of a polyamide resin such as 6-nylon or 6,6-nylon is recommended.

Such binders desirably have a particle size as small as possible so that the adsorptivity of the porous adsorbent may not be impaired. It is also desirable that they be used in a small amount relative to the porous adsorbent. However, when the particle size of the binder is too small, the binder coat layer on the porous adsorbent surface becomes excessively thin, so that the strength in the step of molding may lower. Therefore, a center particle diameter of not less than 1 $\mu$m but not larger than 30 $\mu$m is desirable. The binder is used generally in an amount of 2 to 40 parts by weight. An amount as small as possible is preferred, however, from the viewpoint of preventing the adsorptivity from decreasing, as mentioned above.

The mixing means which can be used in admixing the porous adsorbent with the binder includes, but is not limited to, those in industrial use, for example ordinary mixers, ribbon mixers, static mixers, ball mills, sample mills and kneaders. By utilizing the static electricity generated upon agitating the porous adsorbent with the finely divided resin binder, it is possible to coat the porous adsorbent surface with a very thin, uniform layer of the minute particles. The strength of the coat layer formed is considerably high and, once formed, the coat layer will not be readily peeled off under ordinary procedural conditions. In the step of agitation, it also possible to irradiate the mixture with microwaves, infrared rays, far-infrared rays, radio frequency waves or the like as another heat source.

The porous adsorbent can be formed into an arbitrary shape, for example in the shape of a plate, lattice, honeycomb, paper or sheet, for instance. It is practical and preferable, however, to form it into a plate-like or lattice-like shape. In particular when it is formed into a lattice-like shape, the pressure loss on the occasion of passing air therethrough can be suppressed to a low level. As the forming method, any of the pressure molding methods known in the art can be used, for example the method comprising sealing the porous adsorbent in a mold and pressing the same with heating for effecting contact bonding, or the method comprising spreading the porous adsorbent on a belt and pressing the same with heating by means of a roller, an endless belt or the like to effect contact bonding. The thus-obtained filter produces only a very small amount of a fine powder fraction of the porous adsorbent. The following examples illustrate the present invention in further detail. They are, however, by no means limitative of the scope of the invention.

EXAMPLES

Acetaldehyde Elimination Test by Passing Air

An acetaldehyde elimination test involving the passage of air was carried out under the following conditions.

Measurement size: 60 mm×60 mm

Amount of activated carbon packed: 7.5 g

Temperature: 25° C.

Total gas flow rate: 110 liters (L)/min.

Gas composition: Air containing 10 ppm of acetaldehyde and having a relative humidity of 50%.

Formaldehyde Elimination Test by Passing Air

A formaldehyde elimination test involving the passage of air was carried out under the following conditions.

Measurement size: 60 mm×60 mm

Amount of activated carbon packed: 7.5 g

Temperature: 25° C.

Total gas flow rate: 110 L/min.

Gas composition: Air containing 10 ppm of formaldehyde and having a relative humidity of 50%.

Example 1

Activated carbon supporting 14% by weight of 2-imidazolidone and 5% by weight of phosphoric acid was produced by spraying activated carbon of carbonized coconut shells having a BET specific surface area of 1,000 $m^2/g$ and a grain size of 20 to 40 mesh with an aqueous solution containing 30% by weight of 2-imidazolidone and 11% by weight of phosphoric acid, followed by 3 hours of drying at 105° C. Using that activated carbon, the acetaldehyde and formaldehyde elimination tests were carried out by passing air therethrough. The results are shown in Table 1 and Table 2.

Example 2

Activated carbon supporting 14% by weight of pseudouric acid and 5% by weight of phosphoric acid was produced by spraying the same activated carbon as used in Example 1 with an aqueous solution containing 30% by weight of pseudouric acid and 11% by weight of phosphoric acid, followed by 3 hours of drying at 105° C. Using that activated carbon, the acetaldehyde and formaldehyde elimination tests were carried out in the same manner as in Example 1 by passing air therethrough. The results are shown in Table 1 and Table 2.

Comparative Example 1

Activated carbon supporting 14% by weight of 2-imidazolidone by spraying the same activated carbon as used in Example 1 with a 30% (by weight) aqueous solution of 2-imidazolidone, followed by 3 hours of drying at 105° C. Using that activated carbon, the acetaldehyde and formaldehyde elimination tests were carried out by passing air therethrough. The results are shown in Table 1 and Table 2.

Comparative Example 2

Activated carbon supporting 14% by weight of pseudouric acid by spraying the same activated carbon as used in Example 1 with a 30% (by weight) aqueous solution of pseudouric acid, followed by 3 hours of drying at 105° C. Using that activated carbon, the acetaldehyde and formaldehyde elimination tests were carried out in the same manner by passing air therethrough. The results are shown in Table 1 and Table 2.

Comparative Example 3

Activated carbon supporting 5% by weight of phosphoric acid by spraying the same activated carbon as used in Example 1 with a 11% (by weight) aqueous solution of phosphoric acid, followed by 3 hours of drying at 105° C. Using that activated carbon, the acetaldehyde and formaldehyde elimination tests were carried out in the same manner by passing air therethrough. The results are shown in Table 1 and Table 2.

Comparative Example 4

The same activated carbon as used in Example 1 was dried at 105° C. for 3 hours and then submitted to the same acetaldehyde and formaldehyde elimination test as mentioned above by passing air therethrough. The results are shown in Table 1 and Table 2.

TABLE 1

Acetaldehyde elimination capacity (air passing test)

| | Species and amount of substance supported (% by weight) | Acetaldehyde elimination percentage (%) after | | |
|---|---|---|---|---|
| | | 10 min. | 20 min. | 30 min. |
| Example 1 | 2-Imidazolidone | 60.5 | 54.9 | 49.4 |
| Example 2 | Pseudouric acid (14) and phosphoric acid (5) | 62.8 | 56.4 | 50.8 |
| Compar. Example 1 | 2-Imidazolidone (14) | 15.6 | 9.4 | 6.3 |
| Compar. Example 2 | Pseudouric acid (14) | 18.8 | 10.5 | 8.2 |
| Compar. Example 3 | Phosphoric acid (5) | 3.0 | 1.8 | 1.5 |
| Compar. Example 4 | Activated carbon alone (0) | 3.3 | 2.0 | 1.7 |

TABLE 2

Formaldehyde elimination capacity (air passing test)

| | Species and amount of substance supported (% by weight) | Formaldehyde elimination percentage (%) after | | |
|---|---|---|---|---|
| | | 10 min. | 20 min. | 30 min. |
| Example 1 | 2-Imidazolidone (14) and phosphoric acid (5) | 96.6 | 96.3 | 95.3 |
| Example 2 | Pseudouric acid (14) and phosphoric acid (5) | 97.8 | 97.4 | 96.8 |
| Compar. Example 1 | 2-Imidazolidone (14) | 66.6 | 57.4 | 53.8 |
| Compar. Example 2 | Pseudouric acid (14) | 68.2 | 59.8 | 56.8 |
| Compar. Example 3 | Phosphoric acid (5) | 30.8 | 10.8 | 4.5 |
| Compar. Example 4 | Activated carbon alone (0) | 34.8 | 15.5 | 9.7 |

Examples 3 to 6

The adsorbents specified below in Table 3 were obtained by causing 2-imidazolidone as a urea compound and the inorganic or organic acid specified in Table 3 to be carried on the same activated carbon as used in Example 1. They were subjected to the same acetaldehyde elimination test as mentioned above, whereby the results shown in Table 4 were obtained. As the results indicate, it is evident that the activated carbon species used in accordance with the present invention are capable of removing lower aldehydes efficiently and over a long period of time and are excellent in elimination rate.

TABLE 3

| Sample No. | Amount of 2-imidazolidone supported | Species and amount of inorganic or organic acid | |
|---|---|---|---|
| 1 | 14% by weight | Sulfuric acid | 5% by weight |
| 2 | 14% by weight | Hydrochloric acid | 5% by weight |
| 3 | 14% by weight | Malic acid | 5% by weight |
| 4 | 14% by weight | p-Toluenesulfonic acid | 5% by weight |

TABLE 4

Acetaldehyde elimination capacity (air passing test)

| | Species and amount of substance supported (% by weight) | Acetaldehyde elimination percentage (%) after | | |
|---|---|---|---|---|
| | | 10 min. | 20 min. | 30 min. |
| Example 3 | 2-Imidazolidone (14) and sulfuric acid (5) | 70.4 | 55.4 | 45.8 |
| Example 4 | 2-Imidazolidone (14) and hydrochloric acid (5) | 75.1 | 65.4 | 54.1 |
| Example 5 | 2-Imidazolidone (14) and malic acid (5) | 42.7 | 37.8 | 35.0 |
| Example 6 | 2-Imidazolidone (14) and p-toluenesulfonic acid (5) | 61.7 | 42.1 | 33.7 |

Comparative Example 5

Activated carbon carrying 8% by weight of aniline was produced by spraying the same activated carbon as used in Example 1 with aniline, followed by 3 hours of drying at 105° C. Using the thus-obtained aniline-supporting activated carbon, the same acetaldehyde elimination test as mentioned above was carried out by passing air therethrough. The results are shown in Table 5.

Comparative Example 6

Activated carbon carrying 8% by weight of aniline was produced by spraying the same activated carbon as used in Example 1 with aniline, followed by 3 hours of drying at 105° C. For evaluating the adsorbent obtained for heat resistance, it was subjected to heat treatment at 140° C. in air for 3 hours and then subjected to the same acetaldehyde elimination test by passing air therethrough, to give the results shown in Table 5.

Example 7

Activated carbon carrying 14% by weight of 2-imidazolidone and 5% by weight of phosphoric acid was produced by spraying the same activated carbon as used in Example 1 with an aqueous solution containing 30% by weight of 2-imidazolidone and 11% by weight of phosphoric acid, followed by 3 hours of drying at 105° C. For evaluating the adsorbent obtained for heat resistance, it was subjected to heat treatment at 140° C. in air for 3 hours and then subjected to the same acetaldehyde elimination test by passing air therethrough, to give the results shown in Table 5.

Example 8

Activated carbon carrying 14% by weight of 2-imidazolidone and 5% by weight of sulfuric acid was produced by spraying the same activated carbon as used in Example 1 with an aqueous solution containing 30% by weight of 2-imidazolidone and 11% by weight of sulfuric acid, followed by 3 hours of drying at 105° C. For evaluating the adsorbent obtained for heat resistance, it was subjected to heat treatment at 140° C. in air for 3 hours and then subjected to the same acetaldehyde elimination test by passing air therethrough, to give the results shown in Table 5. From the results obtained, it is evident that the adsorbents according to the invention are excellent in heat resistance as well. The results of Examples 1 to 8 clearly indicate that the adsorbents of the invention can eliminate lower aldehydes at ordinary temperature with good efficiency and are excellent also in rate of adsorption and in heat resistance.

TABLE 5

Acetaldehyde elimination capacity (air passing test)

| Example or Compar. Example | Species and amount of substance supported (% by weight) | Acetaldehyde elimination percentage (%) after | | |
|---|---|---|---|---|
| | | 10 min. | 20 min. | 30 min. |
| Compar. Example 5 | 8% by weight of aniline supported | 42.3 | 23.2 | 14.1 |
| Compar. Example 6 | 8% by weight of aniline supported, 3 hours of treatment at 140° C. | 25.4 | 14.0 | 9.5 |
| Example 7 | 14% by weight of 2-imidazolidone and 5% by weight of phosphoric acid supported, 3 hours of heat treatment at 140° C. | 58.5 | 53.2 | 44.5 |
| Example 8 | 14% by weight of 2-imidazolidone and 5% by weight of sulfuric acid supported, 3 hours of heat treatment at 140° C. | 67.9 | 53.6 | 44.7 |

Example 9

85 g of the 2-imidazolidone- and phosphoric acid-supporting activated carbon obtained in Example 1 and 15 g of a fine polyethylene powder with a center particle diameter of 20 μm were put into a mixer and homogeneously mixed up. The mixture was poured into a lattice-shaped mold (100 mm long×100 mm wide×10 mm high; 4 cells/inch; open area percentage 42%) and pressed under a pressure of 10 kg/cm$^2$ at 130° C. for 30 minutes to give a lattice-shaped molding. Ten moldings obtained in this manner were piled up and packed into a polyvinyl chloride column to give a filter for air cleaning. A test gas containing 5 ppm of formaldehyde and having a relative humidity of 40% was passed through that filter at an air flow rate of 20 L/min. After 24 hours of air passing, the outlet gas concentration was measured by means of a Gastec detector (91 L). The results shown in Table 6 were obtained.

Comparative Example 7

Using the 2-imidazolidone-supporting activated carbon obtained in Comparative Example 1, a filter for air cleaning was produced in the same manner as in Example 9. Using this filter, the same formaldehyde elimination test as in Example 9 was carried out by passing the test gas therethrough. The results are shown in Table 6.

Comparative Example 8

Using the phosphoric acid-supporting activated carbon obtained in Comparative Example 3, a filter for air cleaning was produced in the same manner as in Example 9. Using this filter, the same formaldehyde elimination test as in Example 9 was carried out by passing the test gas therethrough. The results are shown in Table 6.

Comparative Example 9

Using the activated carbon obtained in Comparative Example 4, a filter for air cleaning was produced in the same manner as in Example 9. Using this filter, the same formaldehyde elimination test as in Example 9 was carried out by passing the test gas therethrough. The results are shown in Table 6.

TABLE 6

Formaldehyde elimination capacity (air passing test)

| Example or Compar. Example | Species and amount of substance supported (% by weight) | Formaldehyde elimination percentage (%) after after 24 hours |
|---|---|---|
| Example 9 | Filter consisting of moldings made of 2-imidazolidone and phosphoric acid-supporting activated carbon | 100 |
| Compar. Example 7 | Filter consisting of moldings made of 2-imidazolidone activated carbon | 70 |
| Compar. Example 8 | Filter consisting of moldings made of phosphoric acid-supporting activated carbon | 0 |
| Compar. Example 9 | Filter consisting of moldings made of activated carbon | 0 |

According to the present invention, it is possible to provide a porous adsorbent comprising a urea compound having a urea linkage in the molecule thereof and an inorganic acid and/or an organic acid, each supported on a porous support. The porous adsorbent according to the invention can eliminate lower aldehydes efficiently at ordinary temperature and are excellent in rate of adsorption, heat resistance and safety and, therefore, are suited for use as an adsorbent for lower aldehydes. It can be formed into a filter shape for use in cleaning air.

What is claimed is:

1. A porous adsorbent which comprises a urea compound having a urea linkage within the molecule thereof and an inorganic acid and/or an organic acid, each supported on a porous support.

2. The porous adsorbent as claimed in claim 1, wherein the urea compound is a cyclic urea compound.

3. The porous adsorbent as claimed in claim 2, wherein the cyclic urea compound is 2-imidazolidone or pseudouric acid.

4. The porous adsorbent as claimed in claim 1, wherein the porous support is activated carbon.

5. The porous adsorbent as claimed in claim 1, which is an adsorbent for lower aldehydes.

6. The porous adsorbent as claimed in claim 1, which is an air cleaner.

7. The porous adsorbent as claimed in claim 1, which comprises a filter.

8. The filter as claimed in claim 7, which comprises an air cleaner.

9. The porous adsorbent as claimed in claim 1, which is an adsorbent for formaldehyde and/or acetaldehyde.

10. The porous adsorbent as claimed in claim 1, wherein the urea compound is a linear urea compound.

11. The porous adsorbent as claimed in claim 10, wherein the linear urea compound is methylurea, ethylurea, dimethylurea, diethylurea, tetramethylurea, acetylurea, acetylmethylurea, phenylurea or diphenylurea.

12. The porous adsorbent as claimed in claim 2, wherein the cyclic urea compound is hydantoin, allantoin, alloxanic acid, parabanic acid, 5,5-methylhydantoin, urazole, barbituric acid, alloxan, dialuric acid, uramil, dilituric acid, violuric acid, pseudouric acid, uracil, thymine, isocyanuric acid, uric acid or alloxanthine.

13. The porous adsorbent as claimed in claim 1, wherein the urea compound is 0.5 to 60% by weight, relative to the weight of the porous support in an anhydrous state.

14. The porous adsorbent as claimed in claim 1, wherein the urea compound is 5 to 30% by weight, relative to the weight of the porous support in an anhydrous state.

15. The porous adsorbent as claimed in claim 1, which comprises an inorganic acid.

16. The porous adsorbent as claimed in claim 15, wherein the inorganic acid is hydrochloric acid, sulfonic acid, nitric acid or phosphoric acid.

17. The porous adsorbent as claimed in claim 1, which comprises an organic acid.

18. The porous adsorbent as claimed in claim 17, wherein the organic acid is selected from the group consisting of carboxylic acids, sulfonic acids and sulfinic acids.

19. The porous adsorbent as claimed in claim 1, wherein the inorganic acid and/or organic acid is 0.1 to 30% by weight, based on the weight of the porous support in an anhydrous state.

20. The porous adsorbent as claimed in claim 1, wherein the inorganic acid and/or organic acid is 1 to 15% by weight, based on the weight of the porous support in an anhydrous state.

21. The porous adsorbent as claimed in claim 1, wherein the porous support is activated carbon, activated clay, activated alumina, zeolite or silica gel and is in powdery, granular, fibrous, cloth-like, lattice, spherical, cylindrical, honeycomb, plate, paper or sheet form.

22. A porous adsorbent which consists essentially of a urea compound having a urea linkage within the molecule thereof and an inorganic acid and/or an organic acid, each supported on a porous support.

23. The porous adsorbent as claimed in claim 22, wherein the urea compound is a cyclic urea compound.

24. The porous adsorbent as claimed in claim 23, wherein the cyclic urea compound is 2-imidazolidone or pseudouric acid.

25. The porous adsorbent as claimed in claim 22, wherein the porous support is activated carbon.

26. The porous adsorbent as claimed in claim 22, which is an adsorbent for lower aldehydes.

27. The porous adsorbent as claimed in claim 22, which is an air cleaner.

28. The porous adsorbent as claimed in claim 22, which comprises a filter.

29. The filter as claimed in claim 28, which comprises an air cleaner.

30. The porous adsorbent as claimed in claim 22, which is an adsorbent for formaldehyde and/or acetaldehyde.

31. The porous adsorbent as claimed in claim 22, wherein the urea compound is a linear urea compound.

32. The porous adsorbent as claimed in claim 31, wherein the linear urea compound is methylurea, ethylurea, dimethylurea, diethylurea, tetramethylurea, acetylurea, acetylmethylurea, phenylurea or diphenylurea.

33. The porous adsorbent as claimed in claim 23, wherein the cyclic urea compound is hydantoin, allantoin, alloxanic acid, parabanic acid, 5,5-methylhydantoin, urazole, barbituric acid, alloxan, dialuric acid, uramil, dilituric acid, violuric acid, pseudouric acid, uracil, thymine, isocyanuric acid, uric acid or alloxanthine.

34. The porous adsorbent as claimed in claim 22, wherein the urea compound is 0.5 to 60% by weight, relative to the weight of the porous support in an anhydrous state.

35. The porous adsorbent as claimed in claim 22, wherein the urea compound is 5 to 30% by weight, relative to the weight of the porous support in an anhydrous state.

36. The porous adsorbent as claimed in claim 22, which comprises an inorganic acid.

37. The porous adsorbent as claimed in claim 36, wherein the inorganic acid is hydrochloric acid, sulfonic acid, nitric acid or phosphoric acid.

38. The porous adsorbent as claimed in claim 22, which comprises an organic acid.

39. The porous adsorbent as claimed in claim 38, wherein the organic acid is selected from the group consisting of carboxylic acids, sulfonic acids and sulfinic acids.

40. The porous adsorbent as claimed in claim 22, wherein the inorganic acid and/or organic acid is 0.1 to 30% by weight, based on the weight of the porous support in an anhydrous state.

41. The porous adsorbent as claimed in claim 22, wherein the inorganic acid and/or organic acid is 1 to 15% by weight, based on the weight of the porous support in an anhydrous state.

42. The porous adsorbent as claimed in claim 22, wherein the porous support is activated carbon, activated clay, activated alumina, zeolite or silica gel and is in powdery, granular, fibrous, cloth-like, lattice, spherical, cylindrical, honeycomb, plate, paper or sheet form.

* * * * *